(12) United States Patent
Sato

(10) Patent No.: US 6,341,077 B1
(45) Date of Patent: Jan. 22, 2002

(54) BOOSTING CIRCUIT

(75) Inventor: Toshiya Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/699,505

(22) Filed: Oct. 31, 2000

(30) Foreign Application Priority Data

Nov. 15, 1999 (JP) .......................................... 11-323581

(51) Int. Cl.[7] .................................................. H02M 3/18
(52) U.S. Cl. .......................................... 363/60; 327/536
(58) Field of Search .................... 363/59, 60; 327/535, 327/536, 537

(56) References Cited

U.S. PATENT DOCUMENTS

| 4,922,402 A | * | 5/1990 | Olivo et al. .................. 363/60 |
| 5,821,805 A | * | 10/1998 | Jinbo .......................... 327/537 |
| 5,831,844 A | * | 11/1998 | Sudo ............................ 363/60 |
| 6,016,073 A | * | 1/2000 | Ghilardelli et al. .......... 327/536 |
| 6,121,821 A | * | 9/2000 | Miki .......................... 327/536 |

FOREIGN PATENT DOCUMENTS

| JP | 61-80598 | 4/1986 |
| JP | 2-179264 | 7/1990 |
| JP | 11-110989 | 4/1999 |

* cited by examiner

*Primary Examiner*—Matthew Nguyen
(74) *Attorney, Agent, or Firm*—McGinn & Gibb, PLLC

(57) ABSTRACT

A boosting circuit includes at least two capacitive elements, a first switching element, and second and third switching elements. The first switching element series-connects the capacitive elements. The second and third switching elements respectively supply different power supply potentials to one terminal and the other terminal of each capacitive element.

15 Claims, 6 Drawing Sheets

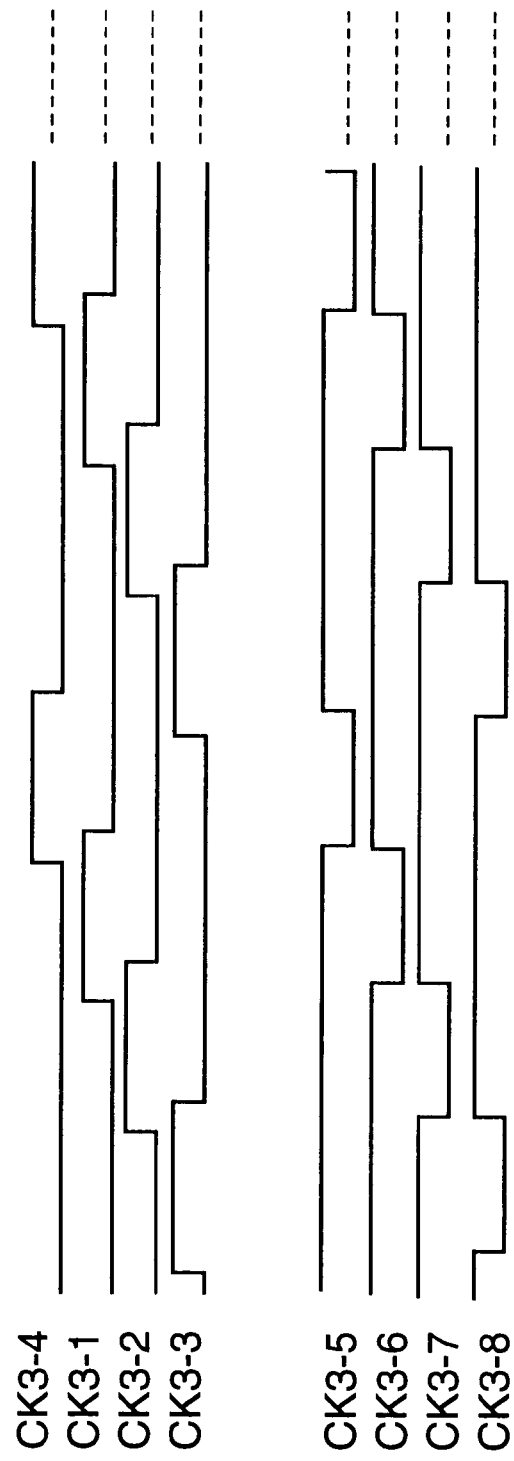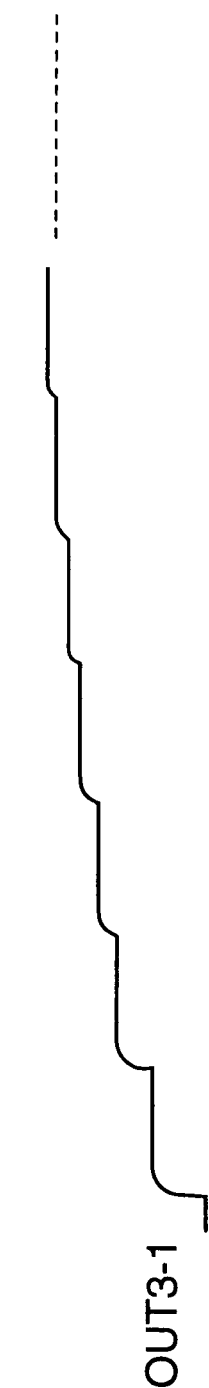
FIG. 6A
FIG. 6B

BOOSTING CIRCUIT

BACKGROUND OF THE INVENTION

1. Field of the Invention

The present invention relates to a boosting circuit and, more particularly, to a boosting circuit with high efficiency used for a power supply circuit.

2. Description of the Prior Art

Another potential higher as an absolute value than an original potential is often generated from a single power supply. A circuit constituted for this purpose is called a boosting circuit.

Important points for comparing the performances of the boosting circuits are roughly classified as follows.

The first point is boosting ability. This point includes whether the boosting circuit has an ability of sufficiently supplying a higher boosted potential and whether the circuit can supply a sufficient current.

The second point is current consumption. When a current consumption value other than a current value actually consumed as a boosting power supply is large even if a sufficiently boosted potential can be obtained, the boosting circuit is very poor in practicability.

The third point is efficiency. The efficiency includes two meanings; one is a boosted potential with respect to current consumption, which is referred to in the second point, and the other is complexity of elements constituting the circuit. In actually constituting the boosting circuit, it is often formed on a semiconductor substrate. At this time, an arrangement which affects the chip size, such as an arrangement using many elements, is inefficient in cost.

Boosting circuits have been developed from these viewpoints, and a typical example is disclosed in Japanese Unexamined Patent Publication No. 11-110989.

Conventional boosting circuits are variously elaborated to increase the boosting efficiency, and the fundamental principle of their boosting scheme is the form of a boosting circuit shown in FIGS. 1, 2A, and 2B. This boosting circuit will be exemplified and explained as a prior art.

FIG. 1 is a circuit diagram showing a conventional boosting circuit.

FIGS. 2A and 2B are waveform charts showing the operation waveforms of the conventional boosting circuit shown in FIG. 1.

In FIG. 1, reference symbols CK7-1 to CK7-4 denote terminals for receiving fundamental clocks for operating the boosting circuit; OUT7-1, an output terminal for outputting a boosted potential; CP7-1 to CP7-4, switching control electrostatic capacitive elements for controlling transfer of a boosted potential; CP7-5 to CP7-8, boosting electrostatic capacitive elements; and N7-1 to N7-8, Nch transistors.

When power supply potentials represented by waveforms as shown in FIG. 2A are input to the contacts CK7-1 to CK7-4 of the circuit shown in FIG. 1, the boosting circuit performs boosting operation as represented by the line OUT7-1 shown in FIG. 2B. On each line in FIG. 2A, the lower line represents "L" level, and the upper line represents "H" level.

Boosting operation of the conventional boosting circuit will be explained as follows by a boosting unit made up of the transistors N7-1 and N7-5, and electrostatic capacitive elements CP7-1 and CP7-5 as an example of a minimum unit.

While the contact CK7-3 is at "L" level, the contact CK7-2 is changed from "L" level to "H" level. At this time, the transistor N7-5 is turned on, and the power supply potential serves as a boosting electrostatic capacitance via the transistor N7-5 to charge the electrostatic capacitive element CP7-5.

Upon completion of charging, the contact CK7-2 drops to "L" level again, and the transistor N7-5 is turned off. After that, the contact CK7-3 is changed to "H" level to generate a boosted potential of 2×VCC level as far as the parasitic capacitance is ignored.

In this prior art, four boosting units are connected and can output a boosted potential of 5×VCC level.

The boosting circuit using this conventional method has the following drawbacks.

To establish the conventional boosting circuit, electric charges to be boosted must move via transistors. In the above example, boosted charges pass through the transistors N7-5, N7-6, N7-7, and N7-8 to boost the potential stepwise.

To realize this movement, the contacts CK7-3 and CK7-4 are clocked. As a result, electric charges which have been used once for boosting are wasted. For example, electric charges which are stored in the electrostatic capacitive element CP7-5 from the contact CK7-3 in order to boost the potential by the electrostatic capacitive element CP7-5 are inevitably wasted to draw new boosting charges from the power supply.

As the potential is boosted higher and higher, current consumption greatly increases before no sufficiently boosted potential is output.

As another drawback, a boosting electrostatic capacitance is difficult to form when such a boosting circuit is implemented on a semiconductor substrate. The main factor of increasing the semiconductor cost is the area of a portion constituting a circuit. On the assumption that a high potential is output, a high potential is applied across the electrostatic capacitance. To prevent destruction by a high electric field, a film forming the electrostatic capacitive element must be made thick. This inevitably increases the area of the electrostatic capacitive element, resulting in high cost.

SUMMARY OF THE INVENTION

The present invention has been made in consideration of the above situation, and has as its object to provide a boosting circuit which requires lower current consumption than a conventional boosting circuit.

It is another object of the present invention to provide a boosting circuit which requires a smaller area on a semiconductor substrate than a conventional boosting circuit.

To achieve the above objects, according to the present invention, there is provided a boosting circuit comprises at least two capacitive elements, a first switching element for series-connecting the capacitive elements, second and third switching elements for respectively supplying different power supply potentials to one terminal and the other terminal of each capacitive element, and means for applying a predetermined power supply potential to one capacitive element out of the capacitive elements using the second and third switching elements, series-connecting remaining capacitive elements by the first switching element except for connection with the capacitive element which receives the predetermined power supply potential by the second and third switching elements, and sequentially changing switching states of first, second, and third switching portions to switching states next to corresponding timings.

In the present invention, a boosted potential is obtained by series-connecting boosting electrostatic capacitances. The respective electrostatic capacitances have means for charging the electrostatic capacitances with the power supply potential and switches for series-connecting the electrostatic capacitances. After charging, the electrostatic capacitive elements are series-connected to discharge a boosted potential, and then repetitively charged with the power supply potential. Since electric charges used for boosting are finally extracted as output charges, no electric charges are wasted except for electric charges drawn to a parasitic capacitance.

The electric field applied to each boosting electrostatic capacitive element does not exceed a potential difference between the power supply potential and the ground potential, so that a film forming each boosting electrostatic capacitive element can be set to a small thickness. Particularly when a boosting circuit is to be formed on a semiconductor substrate, the cost can be reduced.

As is apparent from the above aspects, the present invention can reduce current consumption and cost, compared to the prior art in which the boosting circuit is formed on a semiconductor substrate.

As for reduction in current consumption, all the electric charges which are stored in a boosting electrostatic capacitance are finally output in the boosting circuit of the present invention. For this reason, no electric charges are wastefully discharged, and a large reduction in current consumption can be expected, compared to the prior art.

As for cost reduction, when a boosting circuit is formed on a semiconductor substrate, formation of an electrostatic capacitive element costs most because its area is large.

As a method of reducing the area, the film thickness between parallel plates forming the electrostatic capacitance is set small. In the prior art, however, if the boosting potential rises, the potential difference is directly applied across the electrostatic capacitance to destruct the film. Thus, a decrease in film thickness is limited. To the contrary, in the present invention, no electrostatic capacitive element receives any electric field equal to or higher than the potential difference between the power supply potential and the ground potential. The film thickness can be set small, and the area of the electrostatic capacitive element can be reduced.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIGS. 6A and 6B are waveform charts showing the operation waveforms of the boosting circuit shown in FIG. 5;

DETAILED DESCRIPTION OF PREFERRED EMBODIMENTS

Several preferred embodiments of the present invention will be described in detail below with reference to the accompanying drawings.

Figure 1:
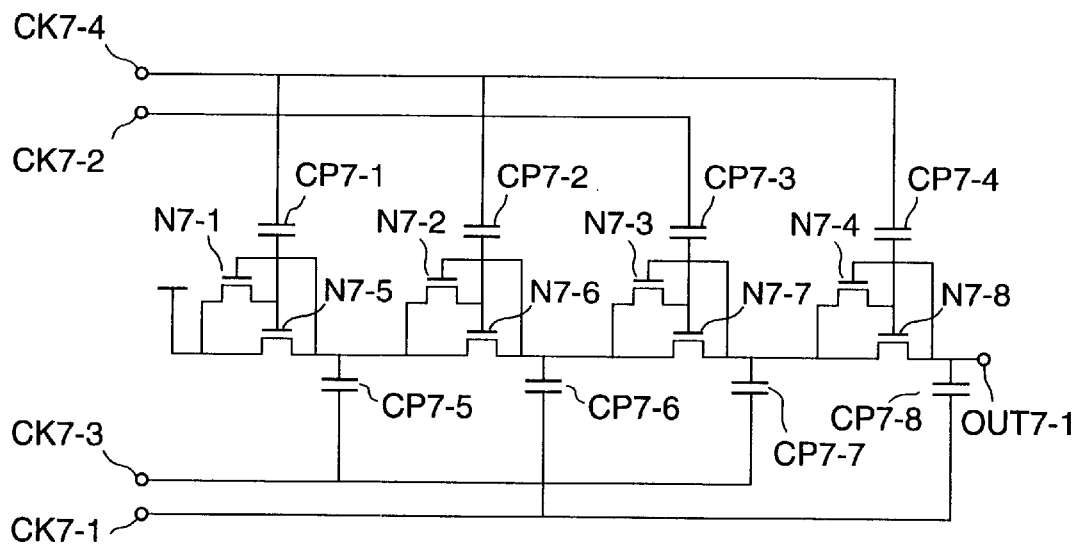
FIG. 1 is a circuit diagram showing a conventional boosting circuit.
Figure 2A:
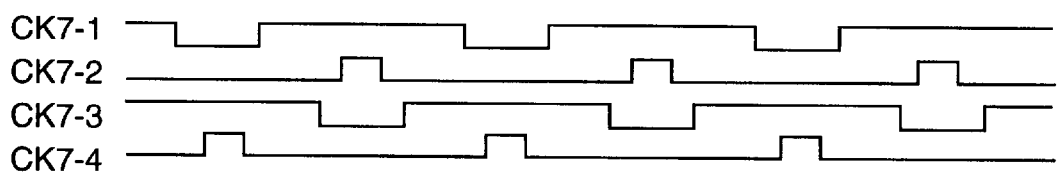
FIGS. 2A and 2B are waveform charts showing the operation waveforms of the conventional boosting circuit shown in FIG. 1.
Figure 2B:
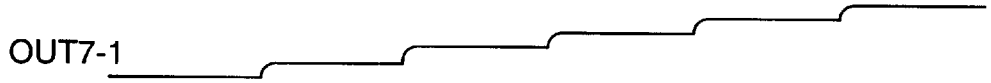
Figure 3:
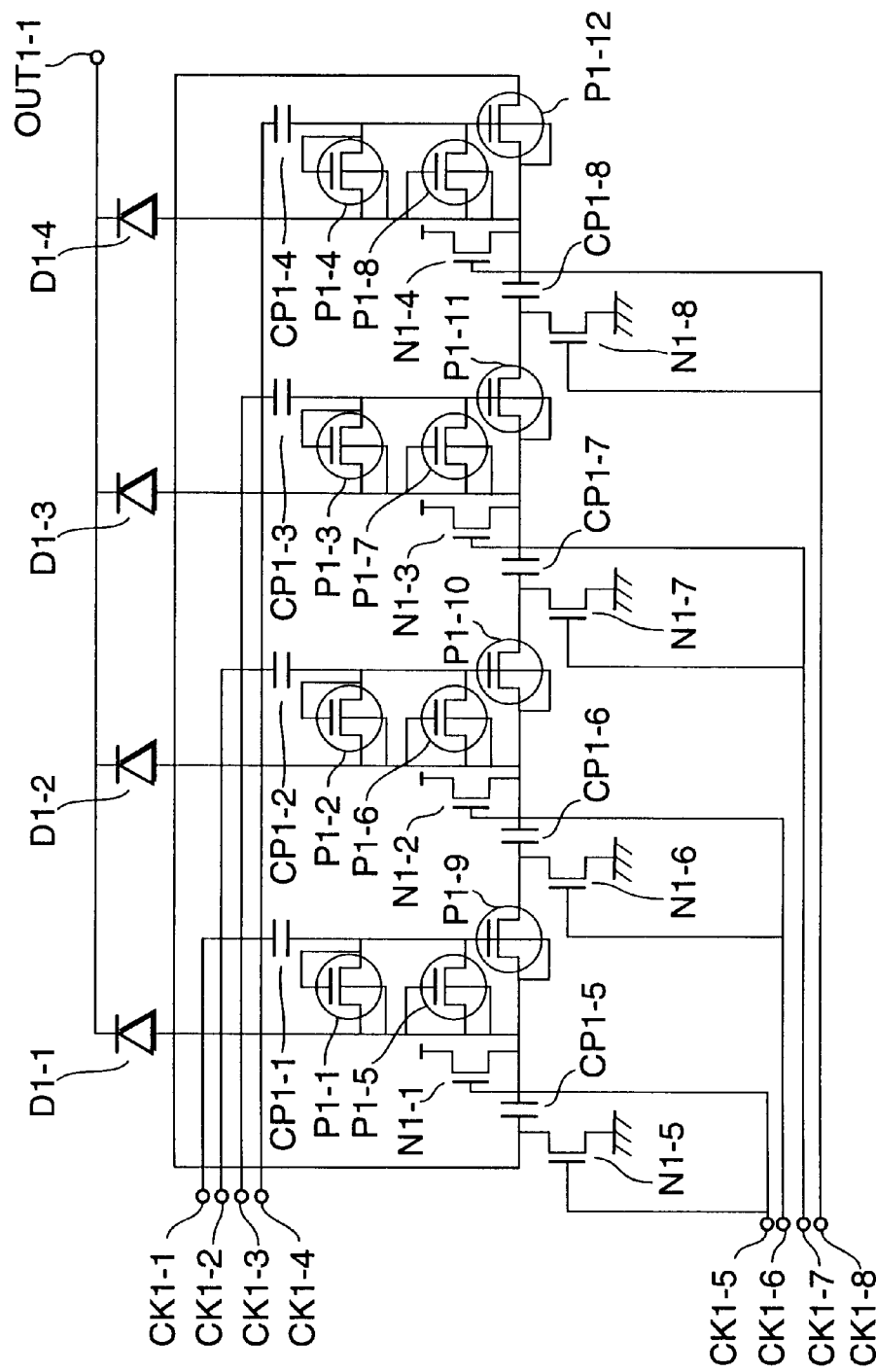
FIG. 3 is a circuit diagram showing the first embodiment of a boosting circuit according to the present invention.

FIG. 3 is a circuit diagram showing the first embodiment of a boosting circuit according to the present invention.

The circuit diagram of FIG. 3 will be explained simply.

Reference symbols CK1-1 to CK1-4 denote fundamental clocks for supplying potentials to switching potential generation self-boot capacitances for controlling series connection of boosting capacitive elements; CK1-5 to CK1-8, fundamental clocks for driving boosting electrostatic capacitances; and OUT1-1, a contact for outputting a boosted potential.

Reference symbols N1-1 to N1-4 denote Nch transistors for charging the boosting electrostatic capacitances with a boosting power supply potential; and N1-5 to N1-8. Nch transistors for setting a ground potential.

Pch transistors P1-9 to P1-12 are elements for controlling series connection of boosting electrostatic capacitive elements CP1-5 to CP1-8. Pch transistors P1-1 to P1-8 and electrostatic capacitive elements CP1-1 to CP1-4 are elements for setting a basic potential for controlling the gate potential of the transistors P1-9 to P1-12.

Reference numerals D1-1 to D1-4 denote diode elements for outputting boosted potentials to the contact OUT1-1.

The operation of this embodiment will be described with reference to FIGS. 3, 4A, and 4B.

Figure 4A:
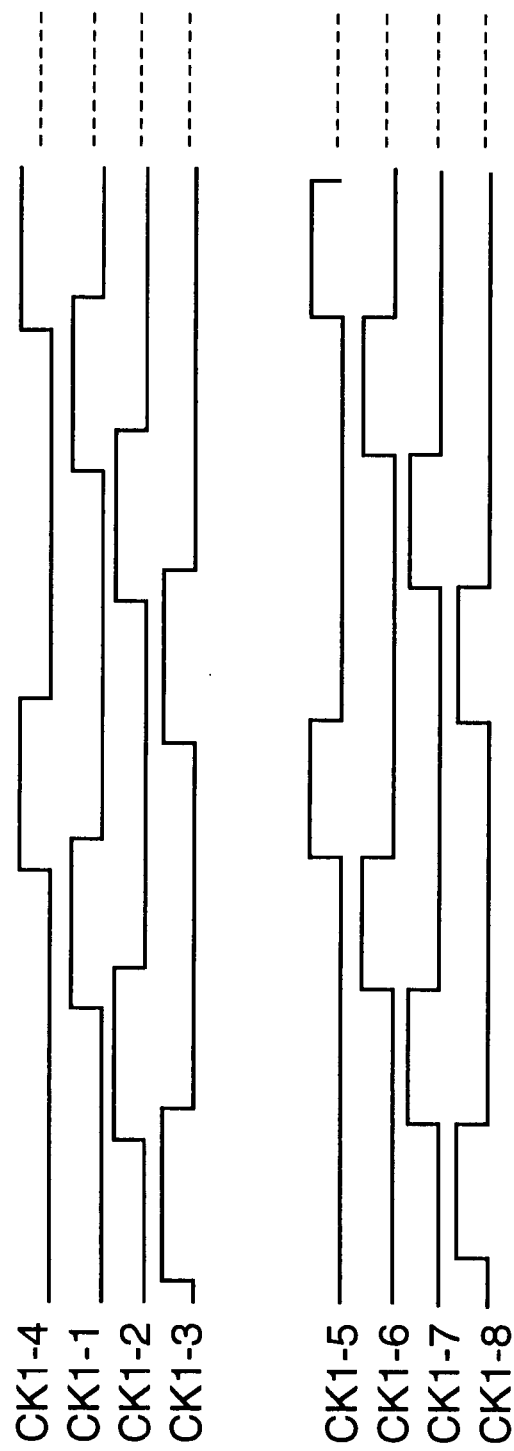
FIGS. 4A and 4B are waveform charts showing the operation waveforms of the boosting circuit shown in FIG. 3.
Figure 4B:

FIGS. 4A and 4B are waveform charts showing the operation waveforms of the boosting circuit shown in FIG. 3. When power supply potential clocks represented by waveforms as shown in FIG. 4A are input to the contacts CK1-1 to CK1-8 of the circuit shown in FIG. 3, the boosting circuit performs boosting operation as represented by the line OUT1-1 shown in FIG. 4B. On each line in FIG. 4A, the lower line represents "L" level, and the upper line represents "H" level.

In the boosting circuit of this embodiment, respective electrostatic capacitive elements store electric charges, and series-connected to output a resultant boosted potential. The discharged electrostatic capacitive elements are charged again, and newly series-connected again to output a re-boosted potential.

Before a description of this operation, the operation of a circuit group serving as a boosting unit will be explained.

The basic unit is exemplified by a circuit group made up of the transistors N1-1, N1-5, P1-1, P1-5, and P1-9 and electrostatic capacitive elements CP1-1 and CP1-5. The operation of this basic circuit group includes two operations; the first operation is charging operation of electric charges, and the second operation is boosting operation.

Charging operation of electric charges as the first operation is charging operation of boosting charges. In this example, charging operation is done when the contact CK1-5 is at "H" level. Since both the transistors N1-5 and N1-1 are turned on when the contact CK1-5 is at "H" level, the electrostatic capacitive element CP1-5 stores electric charges. At this time, the contact CK1-4 is set to "H" level, and the transistor P1-12 is OFF, which prevents electric charges from flowing into the ground power supply via the transistor P1-12.

Boosting operation as the second operation is as follows. Boosting operation of the boosting circuit according to this embodiment is performed by series-connection of electrostatic capacitances. That is, the contacts CK1-5 and CK1-1 are set to "L" level to turn off the transistors N1-5 and N1-1 and turn on the transistor P1-9. Accordingly, the electrostatic capacitive element CP1-5 is series-connected to the electrostatic capacitive element CP1-6.

Under this control, power supply potential clocks having waveforms as shown in FIGS. 4A and 4B are input to sequentially charge the series-connected electrostatic capacitive elements CP1-5 to CP1-8 with electric charges. Boosted charges are output via the diode elements D1-1 to D1-4.

The second embodiment of the present invention will be described with reference to the accompanying drawings.

Figure 5:
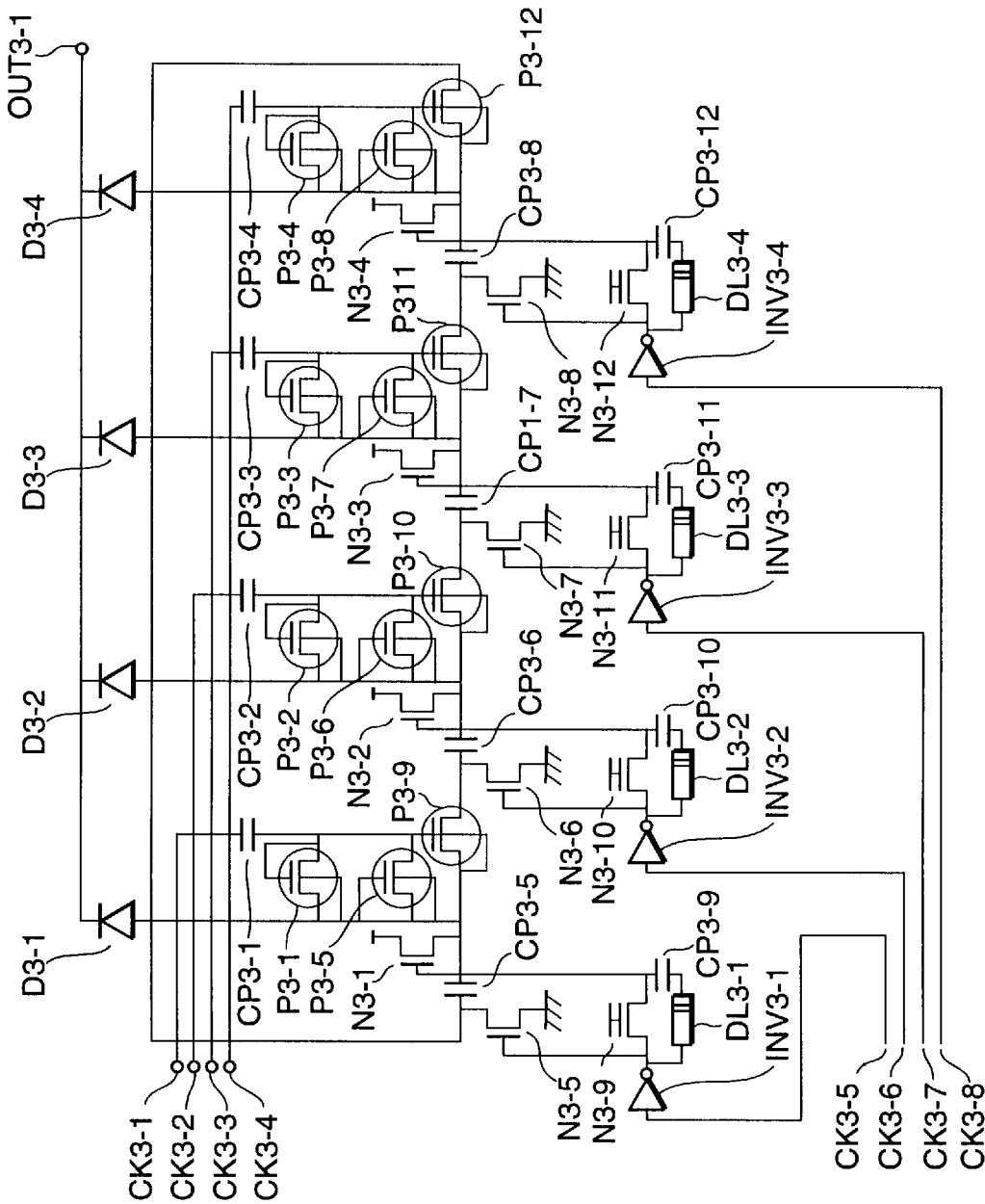
FIG. 5 is a circuit diagram showing the second embodiment of a boosting circuit according to the present invention.

FIG. 5 is a circuit diagram showing the second embodiment of a boosting circuit according to the present invention.

FIGS. 6A and 6B are waveform charts showing the operation waveforms of the boosting circuit shown in FIG. 5.

Figure 7:
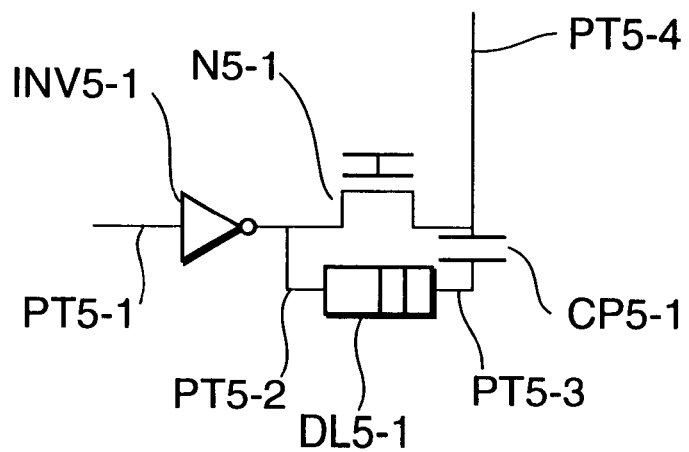
FIG. 7 is a circuit diagram showing a circuit group at a portion in the second embodiment shown in FIG. 5 different from that in the first embodiment shown in FIG. 3.

FIG. 7 is a circuit diagram showing a circuit group at a portion in the second embodiment shown in FIG. 5 different from that in the first embodiment shown in FIG. 3.

Figure 8:
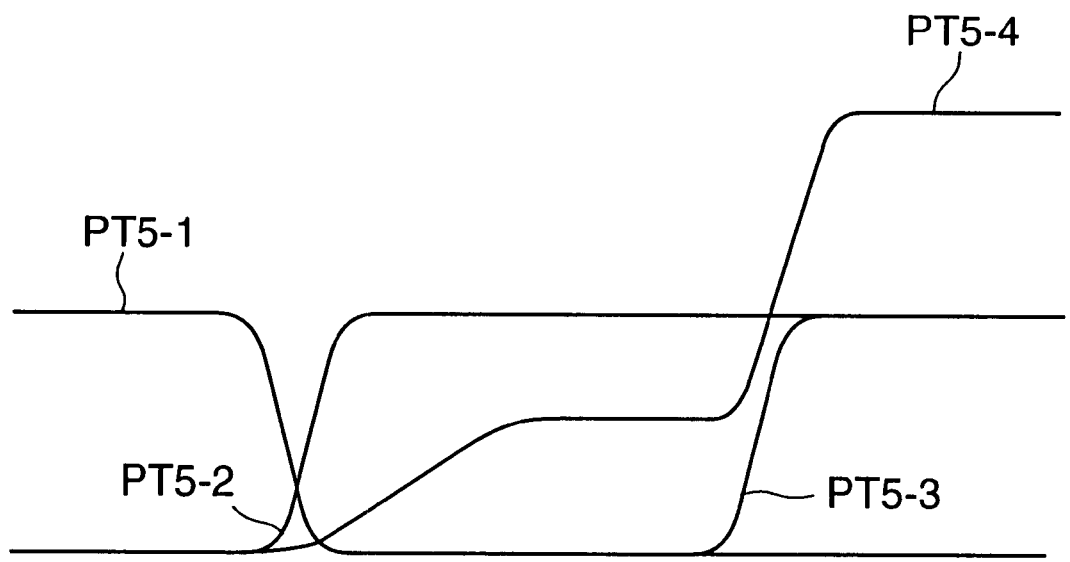
FIG. 8 is a waveform chart showing the operation waveforms of the circuit group shown in FIG. 7.

FIG. 8 is a waveform chart showing the operation waveforms of the circuit group shown in FIG. 7.

In FIG. 5, reference symbols CK3-1 to CK3-8 denote contacts; OUT3-1, an output contact; D3-1 to D3-4, diode elements; CP3-1 to CP3-12, electrostatic capacitive elements; N3-1 to N3-12, Nch transistors; P3-1 to P3-12, Pch transistors; INV3-1 to INV3-4, inverter elements; and DL3-1 to DL3-4, delay elements.

The circuit in FIG. 5 is different from the first embodiment shown in FIG. 3 in that the inverters INV3-1 to INV3-4, Nch transistors N3-9 to N3-12, delay elements DL3-1 to DL3-4, and electrostatic capacitive elements CP3-9 to CP3-12 are added.

The basic operation and input waveforms in the second embodiment are the same as those in the first embodiment. The second embodiment adds a circuit for further increasing the boosting rate, compared to the first embodiment.

FIG. 7 shows the basic arrangement of the added circuit group.

In FIG. 7, reference symbols PT5-1 to PT5-4 denote contacts; CP5-1, an electrostatic capacitive element; N5-1, an Nch transistor; INV5-1, an inverter element; and DL5-1, a delay element.

The purpose of inserting this circuit is to supply a potential equal to or higher than the power supply potential to the gate of a power supply potential charging transistor, e.g., transistor N3-1 and apply to a boosting electrostatic capacitance not an output obtained by subtracting a threshold potential to an Nch transistor but the power supply potential itself, thereby attaining a sufficiently charge potential.

The operation is shown in FIG. 8. When the contact PT5-1 changes from "H" level to "L" level, the contact PT5-2 changes to "H" level. At this time, the contact PT5-4 tries to change to "H" level, but the output potential is output with a decrease corresponding to the threshold potential of the transistor N5-1. Thereafter, when the delay element DL5-1 outputs "H" level, the contact PT5-4 is boosted to the power supply potential or more by the electrostatic capacitive element CP5-1 owing to capacitive coupling. Since the transistor N5-1 is OFF, the potential of the contact 5-4 is held.

By inserting this circuit, the power supply potential charging transistors N3-1 to N3-4 can supply sufficient potentials to their electrostatic capacitances. As a result, a higher boosting rate can be realized.

Note that each of the above-described embodiments has described only a boosting circuit on a positive potential side. An arrangement in which a negative potential is output using the same method also falls within the spirit and scope of the present invention.

What is claimed is:

1. A boosting circuit comprising at least three capacitive elements, a first switching element for series-connecting said at least three capacitive elements, and second and third switching elements for respectively supplying different power supply potentials to one terminal and the other terminal of each capacitive element.

2. A circuit according to claim 1, further comprising a fourth switching element for controlling connection between said one terminal of said capacitive element and an output terminal.

3. A circuit according to claim 2, wherein said fourth switching element is constituted by a diode element.

4. A circuit according to claim 1, wherein said first, second, and third switching elements are constituted by transistors.

5. A circuit according to claim 4, wherein the transistors serving as said second and third switching elements have the same polarity.

6. A circuit according to claim 5, wherein an absolute value of an application potential to gate electrodes of the transistors serving as said second and third switching elements is larger than an absolute value of a switching power supply potential.

7. A circuit according to claim 1, wherein one capacitive element out of said capacitive elements receives a predetermined power supply potential using said second and third switching elements, remaining capacitive elements are series-connected by said first switching element except for connection with said capacitive element which receives the predetermined power supply potential by said second and third switching elements, and switching states of first, second, and third switching portions are sequentially changed to switching states next to corresponding timings.

8. A circuit according to any one of claim 2, wherein said first, second, and third switching elements are constituted by transistors.

9. A circuit according to claim 3, wherein said first, second, and third switching elements are constituted by transistors.

10. A circuit according to claim 2, wherein one capacitive element out of said capacitive elements receives a predetermined power supply potential using said second and third switching elements, remaining capacitive elements are series-connected by said first switching element except for connection with said capacitive element which receives the predetermined power supply potential by said second and third switching elements, and switching states of first, second, and third switching portions are sequentially changed to switching states next to corresponding timings.

11. A circuit according to claim 3, wherein one capacitive element out of said capacitive elements receives a predetermined power supply potential using said second and third switching elements, remaining capacitive elements are series-connected by said first switching element except for connection with said capacitive element which receives the predetermined power supply potential by said second and third switching elements, and switching states of first, second, and third switching portions are sequentially changed to switching states next to corresponding timings.

12. A circuit according to claim 4, wherein one capacitive element out of said capacitive elements receives a predetermined power supply potential using said second and third switching elements, remaining capacitive elements are series-connected by said first switching element except for connection with said capacitive element which receives the predetermined power supply potential by said second and third switching elements, and switching states of first, second, and third switching portions are sequentially changed to switching states next to corresponding timings.

13. A circuit according to claim 5, wherein one capacitive element out of said capacitive elements receives a predetermined power supply potential using said second and third switching elements, remaining capacitive elements are series-connected by said first switching element except for connection with said capacitive element which receives the predetermined power supply potential by said second and third switching elements, and switching states of first, second, and third switching portions are sequentially changed to switching states next to corresponding timings.

14. A circuit according to claim 6, wherein one capacitive element out of said capacitive elements receives a predetermined power supply potential using said second and third switching elements, remaining capacitive elements are series-connected by said first switching element except for connection with said capacitive element which receives the predetermined power supply potential by said second and third switching elements, and switching states of first, second, and third switching portions are sequentially changed to switching states next to corresponding timings.

15. A circuit according to claim 1, wherein an input to said second switching element includes an inverter and an input to said third switching elements includes an inverter, a transistor, a delay element and an electrostatic capacitative element.

* * * * *